(12) United States Patent
Zheng

(10) Patent No.: US 11,168,980 B1
(45) Date of Patent: Nov. 9, 2021

(54) POSITIONING METHOD AND POSITIONING DEVICE OF DISPLAY MODULE

(71) Applicant: Wuhan China Star Optoelectronics Technology Co., LTD., Hubei (CN)

(72) Inventor: Junfeng Zheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 343 days.

(21) Appl. No.: 16/485,437

(22) PCT Filed: Apr. 25, 2019

(86) PCT No.: PCT/CN2019/084212
§ 371 (c)(1),
(2) Date: Aug. 12, 2019

(87) PCT Pub. No.: WO2020/107789
PCT Pub. Date: Jun. 4, 2020

(30) Foreign Application Priority Data

Nov. 29, 2018 (CN) .......................... 201811443420.1

(51) Int. Cl.
*G01B 11/27* (2006.01)
*G02F 1/13* (2006.01)
*G02F 1/1333* (2006.01)
*G01B 11/26* (2006.01)
*G01B 11/14* (2006.01)

(52) U.S. Cl.
CPC ............ *G01B 11/272* (2013.01); *G01B 11/14* (2013.01); *G01B 11/26* (2013.01); *G02F 1/1303* (2013.01);
(Continued)

(58) Field of Classification Search
CPC ..... G01B 11/02; G01B 11/022; G01B 11/024; G01B 11/026; G01B 11/028; G01B 11/14;
(Continued)

(56) References Cited

U.S. PATENT DOCUMENTS 5,825,500 A * 10/1998 Iino ........................ G01N 21/88
356/394
10,803,344 B2 * 10/2020 Tang .................... G06F 16/5854
(Continued)

FOREIGN PATENT DOCUMENTS

CN 101655577 A 2/2010
CN 202189532 U 4/2012
(Continued)

*Primary Examiner* — Gordon J Stock, Jr.
(74) *Attorney, Agent, or Firm* — Benesch, Friedlander, Coplan & Aronoff LLP

(57) ABSTRACT

The present invention provides a positioning method and a positioning device for a display module. The present invention achieves real-time monitoring for the alignment accuracy of a target display module in the horizontal direction by setting a laser calibration device between the target display module and a support table, and determining if a light source received by a receiver in the laser calibration device is disposed on a same horizontal line. The application of the laser calibration device improves alignment accuracy of the target display module and improves yield and quality of the product.

20 Claims, 2 Drawing Sheets

(52) U.S. Cl.
CPC ...... *G02F 1/1313* (2013.01); *G02F 1/133354* (2021.01)

(58) Field of Classification Search
CPC ......... G01B 11/22; G01B 11/26; G01B 11/27; G01B 11/272; G01B 11/30; G01B 11/303; G01B 11/306; G01N 2021/9513; H01L 51/56; G02F 1/1303; G02F 1/1306; G02F 1/1309; G02F 1/13354; G02F 2201/58
See application file for complete search history.

(56) References Cited

U.S. PATENT DOCUMENTS

| | | | |
|---|---|---|---|
| 2009/0141275 A1* | 6/2009 | Han | B32B 41/00 356/400 |
| 2015/0044930 A1* | 2/2015 | Han | H01L 51/56 445/3 |
| 2017/0131641 A1 | 5/2017 | Li et al. | |
| 2018/0210264 A1* | 7/2018 | Tang | H01L 51/0097 |
| 2019/0384179 A1* | 12/2019 | Aoki | G01B 11/00 |
| 2020/0201086 A1* | 6/2020 | Zhang | G02F 1/1303 |

FOREIGN PATENT DOCUMENTS

| | | |
|---|---|---|
| CN | 104614880 A | 5/2015 |
| CN | 105242501 A | 1/2016 |
| CN | 105387805 A | 3/2016 |
| CN | 107248551 A | 10/2017 |
| JP | H08184423 A | 7/1996 |
| JP | H1010508 A | 1/1998 |
| WO | WO-2020042600 A1 * | 3/2020 |

\* cited by examiner

POSITIONING METHOD AND POSITIONING DEVICE OF DISPLAY MODULE

FIELD OF INVENTION

The present application relates to the field of panel manufacturing, and in particular, to a positioning method and a positioning device for a display module.

BACKGROUND OF INVENTION

Modular segment drive ICs and glass package chip-on-glass (COG), flexible printed circuit (FPC), and glass package film on glass (FOG) processes in panel display industry are extremely important, which affect product yield, cost, and reliability. In the COG process, due to the uneven display and related defects caused by alignment problems, manufacturing costs of the display panel is increased, and product competitiveness is greatly reduced.

In the packaging process of current display panel modules, the key processes, including COG/FOG, usually do not pay enough attention to alignment accuracy between the glass production platform and the press-fit device, and the alignment accuracy is poor. At the same time, there is a lack of effective means for real-time monitoring in the production process, resulting in a certain difference in the level of the platform and the pressing equipment in the COG process, resulting in unevenness and fragmentation.

SUMMARY OF INVENTION

The present invention provides a positioning method and a positioning device for a display module to obtain a packaging method for a display module with high precision.

To achieve the above solution, the technical solution provided by the present invention is as follows:

The present invention provides a positioning method of a display module, comprising the following steps:

disposing a target display module on a first support table and a second support table;

disposing a first receiver between the target display module and the first support table, and disposing a second receiver between the target display module and the second support table;

wherein the first receiver receives first emitted light and records first data, and the second receiver receives second emitted light and records second data;

obtaining an absolute value of the difference between the first data and the second data, and comparing the absolute value with a default threshold;

wherein a height of the first support table or the second support table is adjusted when the absolute value of the difference between the first data and the second data is greater than the default threshold, so that the absolute value of the difference between the first data and the second data is not greater than the default threshold;

when the absolute value of the difference between the first data and the second data is not greater than a default threshold, completing the positioning process of the target display module.

In the positioning method of the present invention, wherein before the step of the first receiver receives the first emitted light and records the first data, and the second receiver receives the second emitted light and records the second data, the positioning method further comprises:

disposing a light source emitter and a light source splitter on a same vertical line between the first support table and the second support table; and fixedly connecting the light source emitter and the light source splitter to the first support table.

In the positioning method of the present invention, the light source splitter comprises a first receiving end, a first exit end, and a second exit end;

the center of the first receiving end and the center of the light source emitter are disposed on a same vertical line; and the center of the first exit end and the center of the second exit end are disposed on the same horizontal line, and the angle between an emitting direction of the first exit end and an emitting direction of the second exit end is 180 degrees.

In the positioning method of the present invention, the second support table is a lifting device, and the first support table is a fixing device.

In the positioning method of the present invention, wherein the step of the first receiver receives the first emitted light and records the first data, and the second receiver receives the second emitted light and records the second data comprises:

the light source emitter emits original emitted light;

the first receiving end of the light source splitter receives the original emitted light, emits the first emitted light from the first exit end, and emits the second emitted light from the second outgoing end;

the first receiver receives the first emitted light and records the first data; and the second receiver receives the second emitted light and records the second data.

In the positioning method of the present invention, the first emitted light and the second emitted light are on the same horizontal line, and the angle between the first emitted light and the second emitted light is 180 degrees.

In the positioning method of the present invention, the second receiver is disposed between the first support table and the second support table, and the second receiver is fixedly connected to the second support table.

In the positioning method of the present invention, a buffer layer is further disposed between the target display module and the first support table.

In the positioning method of the present invention, the target display module comprises a binding area; and the second support table corresponds to the binding area.

In the positioning method of the present invention, the target display module is a liquid crystal display (LCD) module or an organic light emitting diode (OLED) display module.

The present invention further provides a positioning device of a display module, comprising:

a support member, comprising a first support table and a second support table, and the support member is used for supporting a target display module; and a laser calibration device, comprising a light source emitter, a light source splitter, and a light source receiver, and the light source emitter emitting original emitted light through the light source splitter into the light source receiver;

wherein the light source receiver comprises:

a first receiver disposed adjacent to the first support table, the first receiver receives first emitted light emitted by the light source emitter and records first data; and a second receiver disposed adjacent to the second support table, the second receiver receives second emitted light emitted by the light source emitter and records second data;

a height of the first support table or the second support table is adjusted when an absolute value of the difference between the first data and the second data is greater than a default threshold, so that the absolute value of the difference between the first data and the second data is not greater than the default threshold;

when the absolute value of the difference between the first data and the second data is not greater than the default threshold, completing the positioning process of the target display module.

In the positioning device of the present invention, the light source emitter and the light source splitter are disposed between the first support table and the second support table, and are disposed on a same vertical line; and the light source emitter and the light source splitter are fixedly connected to the first support table.

In the positioning device of the present invention, the light source splitter comprises a first receiving end, a first exit end, and a second exit end;

the center of the first receiving end and the center of the light source emitter are disposed on a same vertical line; and the center of the first exit end and the center of the second exit end are disposed on the same horizontal line, and the angle between the emitting direction of the first exit end and the emitting direction of the second exit end is 180 degrees.

In the positioning device of the present invention, the light source emitter emits the original emitted light, the first receiving end of the light source splitter receives the original emitted light, emits the first emitted light from the first exit end, and emits the second emitted light from the second outgoing end.

In the positioning device of the present invention, the first emitted light and the second emitted light are on the same horizontal line, and the angle between the first emitted light and the second emitted light is 180 degrees.

In the positioning device of the present invention, the second receiver is disposed between the first support table and the second support table, and the second receiver is fixedly connected to the second support table.

In the positioning device of the present invention, the second support table is a lifting device, and the first support table is a fixing device.

In the positioning device of the present invention, a buffer layer is further disposed between the target display module and the first support table.

In the positioning device of the present invention, the target display module comprises a binding area; and the second support table corresponds to the binding area.

In the positioning device of the present invention, the target display module is a liquid crystal display (LCD) module or an organic light emitting diode (OLED) display module.

The beneficial effects of the invention: The present invention achieves real-time monitoring for the alignment accuracy of the target display module in the horizontal direction by setting the laser calibration device between the target display module and the support table, and determining if the light source received by the receiver in the laser calibration device is disposed on the same horizontal line. The application of the laser calibration device improves the alignment accuracy of the target display module and improves the yield and quality of the product.

DESCRIPTION OF DRAWINGS

In order to further understand the features and technical details of the present invention, please refer to the following detailed description and drawings regarding the present invention. The drawings are provided for reference and description only and are not intended to limit the present invention.

DETAILED DESCRIPTION OF PREFERRED EMBODIMENTS

Figure 1:
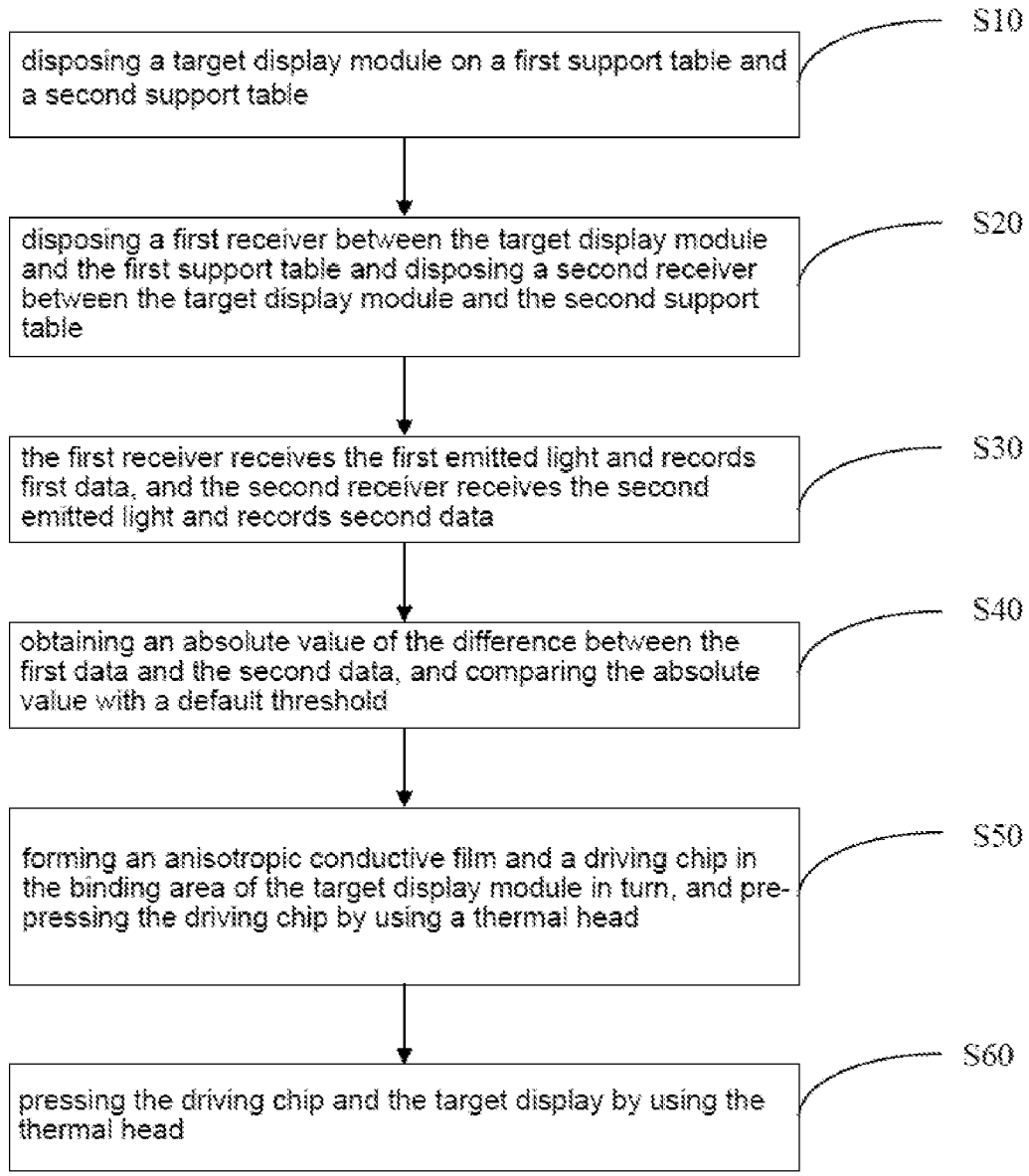
FIG. 1 is a step diagram of a positioning method of a display module of the present invention.

The following description of the various embodiments is provided to illustrate the specific embodiments of the invention. Directional terms mentioned in this application, such as "upper," "lower," "previous," "post," "left," "right," "inside," "outside," "side," etc., are only refer to the direction of the drawing. Therefore, the directional terminology used is for the purpose of illustration and understanding, and is not intended to be limiting. In the figures, structurally similar elements are denoted by the same reference numerals.

Figure 2:
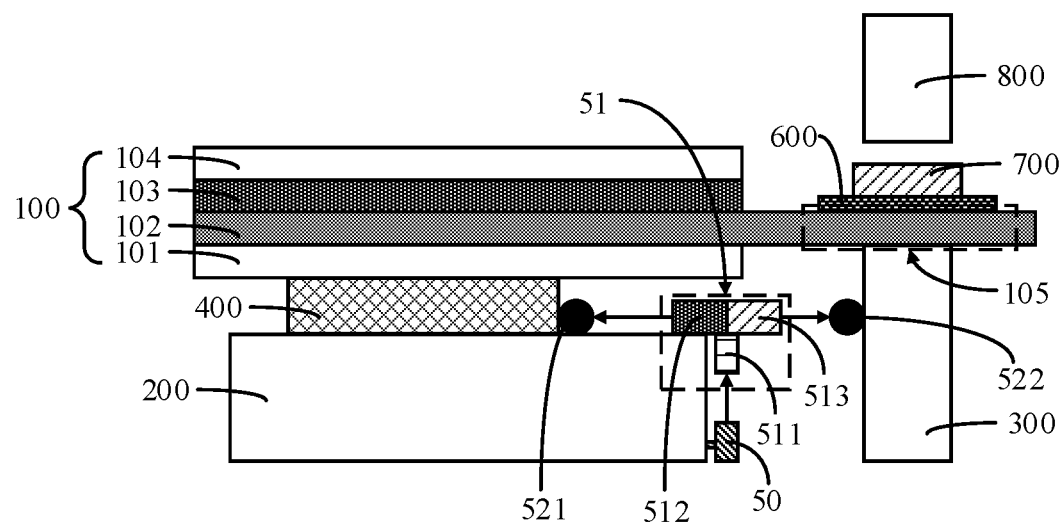
FIG. 2 is a structural diagram of a positioning device of the display module of the present invention.

Please refer to FIG. 1, FIG. 1 is a step diagram of a positioning method of a display module of the present invention; and Please refer to FIG. 2, FIG. 2 is a structural diagram of a positioning device of the display module of the present invention.

The positioning method of the display module, comprising the following steps:

S10: disposing a target display module on a first support table and a second support table.

In one embodiment, the target display module is a liquid crystal display (LCD) module or an organic light emitting diode (OLED) display module. This application takes the LCD module as an example for illustration.

The target display module 100 includes a lower polarizing plate 101, an array substrate 102 disposed on the lower polarizing plate 101, a liquid crystal layer (not shown) disposed on the array substrate 102, the color filter substrate 103 disposed on the liquid crystal layer, and the upper polarizing plate 104 disposed on the color filter substrate 103.

The array substrate 102 includes a pixel area and a binding area 105.

In this step, the target display module 100 is disposed on the first support table 200 and the second support table 300. The first support table 200 corresponds to the pixel area, and the second support table 300 corresponds to the binding area 105.

A buffer layer 400 is further disposed between the pixel region and the first support table 200. The buffer layer 400 is used for protecting the lower polarizing plate 101 from being scratched by the first support table 200 or the like.

S20: disposing a first receiver between the target display module and the first support table and disposing a second receiver between the target display module and the second support table.

S20 further comprises setting of a laser calibration device. The laser calibration device comprises a light source emitter 50, a light source splitter 51 and a light source receiver. The light source receiver includes a first receiver 521 and a second receiver 522.

This step specifically includes:

S201: the light source emitter and the light source splitter are on a same vertical line disposed between the first support table and the second support table.

The first support table 200 or the second support table 300 may be a lifting device.

As shown in FIG. 2, in an embodiment, when the second support table 300 is a lifting device and the first support table 200 is a fixing device, the light source emitter 50 and the light source splitter 51 are fixedly connected to the first support table 200.

In an embodiment, when the first support table 200 is a lifting device and the second support table 300 is a fixing device, the light source emitter 50 and the light source splitter 51 are fixedly connected to the second support table 300. This invention does not discuss such a solution.

In an embodiment, the light source splitter 51 comprises a first receiving end 511, a first exit end 512, and a second exit end 513. The center of the first receiving end 511 and the center of the light source emitter 512 are disposed on a same vertical line. The center of the first exit end 512 and the center of the second exit end 513 are disposed on the same horizontal line, and the angle between an emitting direction of the first exit end 512 and an emitting direction of the second exit end 513 is 180 degrees.

S202: disposing a first receiver between the target display module and the first support table.

The first receiver 521 is disposed on the first support table 200 and disposed adjacent to the buffer layer. The center of the first receiver 521 is on the same horizontal line as the center of the light source splitter 51.

S203: disposing a second receiver between the target display module and the second support table.

The second receiver 522 is disposed between the first support table 200 and the second support table 300, and the second receiver is 522 fixedly connected to the second support table 300.

S30: the first receiver receives the first emitted light and records first data, and the second receiver receives the second emitted light and records second data.

S30 specifically includes:

S301: the light source emitter emits the original emitted light, and

S302: the first receiving end of the light source splitter receives the original emitted light, emits the first emitted light from the first exit end, and emits the second emitted light from the second outgoing end.

After the original emitted light passes through the light source splitter 51, the first emitted light and the second emitted light are formed in two opposite directions. The first emitted light is received by the first receiver 521 via the first exit end 512. The second emitted light is received by the second receiver 522 via the second exit end 513.

S303: the first receiver receives the first emitted light and records first data, and S304: the second receiver receives the second emitted light and records second data.

In this embodiment, S303 and S304 are proceeded simultaneously.

The first data mainly records an angle between the first emitted light and a horizontal direction. The second data mainly records an angle between the second emitted light and the horizontal direction.

In an embodiment, the first emitted light and the second emitted light are on the same horizontal line, and the angle between the first emitted light and the second emitted light is 180 degrees.

S40: obtaining an absolute value of the difference between the first data and the second data, and comparing the absolute value with a default threshold.

In this step, when the absolute value of the difference between the first data and the second data is greater than the default threshold, the tester can adjust the height of the first support table 200 or the second support table 300, which makes the absolute value of the difference between the first data and the second data is not greater than the default threshold.

The height of the first support table 200 is finely adjusted when the first support table 200 is a lifting device. The height of the second support table 300 is finely adjusted when the second support table 300 is a finely device. In this embodiment, the absolute value of the difference between the first data and the second data is not greater than the default threshold by finely adjusting the height of the second support table 300.

Ideally, the absolute value of the difference between the first data and the second data is zero. The centers of the first receiver 521, the second receiver 522, and the light source splitter 51 are disposed on the same horizontal line.

When the absolute value of the difference between the first data and the second data is not greater than the default threshold, the positioning process of the target display module 100 is completed.

S50: forming an anisotropic conductive film and a driving chip in the binding area of the target display module in turn, and pre-pressing the driving chip by using a thermal head.

The binding area of the target display module corresponds to the second support column.

S60: pressing the driving chip and the target display by using the thermal head.

The laser calibration device in the present invention completes the alignment by the light source splitter, ensures the singularity of the light source, reduces the risk of light source offset and the influence of the environment (dust, particles), and improves the alignment accuracy of the target display module in the horizontal direction.

Please refer to FIG. 2, the present invention further provides a positioning device for the display module.

The positioning device of the display module comprises:

a support member, comprising a first support table and a second support table, and the support member is used for supporting a target display module; and a laser calibration device, comprising a light source emitter, a light source splitter, and a light source receiver, and the light source emitter emitting original emitted light through the light source splitter into the light source receiver;

wherein the light source receiver comprises:

a first receiver disposed adjacent to the first support table, the first receiver receives the first emitted light emitted by the light source emitter and records first data; and a second receiver disposed adjacent to the second support table, the second receiver receives the second emitted light emitted by the light source emitter and records second data;

a height of the first support table or the second support table is adjusted when an absolute value of the difference between the first data and the second data is greater than a default threshold, so that the absolute value of the difference between the first data and the second data is not greater than the default threshold;

when the absolute value of the difference between the first data and the second data is not greater than the default threshold, completing the positioning process of the target display module.

In an embodiment, the light source emitter and the light source splitter are disposed between the first support table and the second support table, and are disposed on a same vertical line; and the light source emitter and the light source splitter are fixedly connected to the first support table.

In an embodiment, the light source splitter comprises a first receiving end, a first exit end, and a second exit end;

the center of the first receiving end and the center of the light source emitter are disposed on a same vertical line; and the center of the first exit end and the center of the second exit end are disposed on the same horizontal line, and the angle between the emitting direction of the first exit end and the emitting direction of the second exit end is 180 degrees.

In the positioning device of the present invention, the light source emitter emits the original emitted light, the first receiving end of the light source splitter receives the original emitted light, emits the first emitted light from the first exit end, and emits the second emitted light from the second outgoing end.

In an embodiment, the first emitted light and the second emitted light are on the same horizontal line, and the angle between the first emitted light and the second emitted light is 180 degrees.

In an embodiment, the second receiver is disposed between the first support table and the second support table, and the second receiver is fixedly connected to the second support table.

In an embodiment, the second support table is a lifting device, and the first support table is a fixing device.

In an embodiment, a buffer layer is further disposed between the target display module and the first support table.

In an embodiment, the target display module comprises a binding area; and the second support table corresponds to the binding area.

In an embodiment, the target display module is a LCD module or an OLED display module.

The present invention provides the positioning method and the positioning device for the display module, which comprises: disposing the first receiver between the target display module and the first support table, and disposing the second receiver between the target display module and the second support table; wherein the first receiver receives the first emitted light and records the first data, and the second receiver receives the second emitted light and records the second data; obtaining an absolute value of the difference between the first data and the second data, and comparing the absolute value with the default threshold. The present invention achieves real-time monitoring for the alignment accuracy of the target display module in the horizontal direction by setting the laser calibration device between the target display module and the support table, and determining if the light source received by the receiver in the laser calibration device is disposed on the same horizontal line. The application of the laser calibration device improves the alignment accuracy of the target display module and improves the yield and quality of the product.

In the above, various other corresponding changes and modifications can be made according to the technical solutions and technical ideas of the present invention to those skilled in the art, and all such changes and modifications are within the scope of the claims of the present invention.

What is claimed is:

1. A positioning method of a display module, comprising the following steps:

disposing a target display module on a first support table and a second support table;

disposing a first receiver between the target display module and the first support table, and disposing a second receiver between the target display module and the second support table;

wherein the first receiver receives first emitted light and records first data, and the second receiver receives second emitted light and records second data;

obtaining an absolute value of the difference between the first data and the second data, and comparing the absolute value with a default threshold;

wherein a height of the first support table or the second support table is adjusted when the absolute value of the difference between the first data and the second data is greater than the default threshold, so that the absolute value of the difference between the first data and the second data is not greater than the default threshold;

when the absolute value of the difference between the first data and the second data is not greater than a default threshold, completing the positioning process of the target display module.

2. The positioning method as claimed in claim 1, wherein:
the second receiver is disposed between the first support table and the second support table, and the second receiver is fixedly connected to the second support table.

3. The positioning method as claimed in claim 1, wherein:
a buffer layer is further disposed between the target display module and the first support table.

4. The positioning method as claimed in claim 1, wherein:
the target display module comprises a binding area; and
the second support table corresponds to the binding area.

5. The positioning method as claimed in claim 1, wherein:
the target display module is a liquid crystal display (LCD) module or an organic light emitting diode (OLED) display module.

6. The positioning method as claimed in claim 1, wherein before the step of the first receiver receives the first emitted light and records the first data, and the second receiver receives the second emitted light and records the second data, the positioning method further comprises:

disposing a light source emitter and a light source splitter on a same vertical line disposed between the first support table and the second support table; and fixedly connecting the light source emitter and the light source splitter to the first support table.

7. The positioning method as claimed in claim 6, wherein:
the second support table is a lifting device, and the first support table is a fixing device.

8. The positioning method as claimed in claim 6, wherein:
the light source splitter comprises a first receiving end, a first exit end, and a second exit end;
the center of the first receiving end and the center of the light source emitter are disposed on a same vertical line; and
the center of the first exit end and the center of the second exit end are disposed on the same horizontal line, and the angle between an emitting direction of the first exit end and an emitting direction of the second exit end is 180 degrees.

9. The positioning method as claimed in claim 8, wherein the step of the first receiver receives the first emitted light and records the first data, and the second receiver receives the second emitted light and records the second data comprises:

the light source emitter emits original emitted light;
the first receiving end of the light source splitter receives the original emitted light, emits the first emitted light from the first exit end, and emits the second emitted light from the second exit end;

the first receiver receives the first emitted light and records the first data; and the second receiver receives the second emitted light and records the second data.

10. The positioning method as claimed in claim 9, wherein:

the first emitted light and the second emitted light are on the same horizontal line, and the angle between the first emitted light and the second emitted light is 180 degrees.

11. A positioning device of a display module, comprising:

a support member comprising a first support table and a second support table, and the support member is used for supporting a target display module; and a laser calibration device comprising a light source emitter, a light source splitter, and a light source receiver, and the light source emitter emitting original emitted light through the light source splitter into the light source receiver;

wherein the light source receiver comprises:

a first receiver disposed adjacent to the first support table, the first receiver receives the first emitted light emitted by the light source emitter and records first data; and a second receiver disposed adjacent to the second support table, the second receiver receives the second emitted light emitted by the light source emitter and records a second data;

a height of the first support table or the second support table is adjusted when an absolute value of the difference between the first data and the second data is greater than a default threshold, so that the absolute value of the difference between the first data and the second data is not greater than the default threshold;

when the absolute value of the difference between the first data and the second data is not greater than the default threshold, completing the positioning process of the target display module.

12. The positioning device as claimed in claim 11, wherein:

the second receiver is disposed between the first support table and the second support table, and the second receiver is fixedly connected to the second support table.

13. The positioning device as claimed in claim 11, wherein:

the second support table is a lifting device, and the first support table is a fixing device.

14. The positioning device as claimed in claim 11, wherein:

a buffer layer is further disposed between the target display module and the first support table.

15. The positioning device as claimed in claim 11, wherein the target display module comprises a binding area; and the second support table corresponds to the binding area.

16. The positioning device as claimed in claim 11, wherein the target display module is a liquid crystal display (LCD) module or an organic light emitting diode (OLED) display module.

17. The positioning device as claimed in claim 11, wherein:

the light source emitter and the light source splitter are disposed between the first support table and the second support table, and are disposed on a same vertical line; and the light source emitter and the light source splitter are fixedly connected to the first support table.

18. The positioning device as claimed in claim 17, wherein:

the light source splitter comprises a first receiving end, a first exit end, and a second exit end;

the center of the first receiving end and the center of the light source emitter are disposed on a same vertical line; and the center of the first exit end and the center of the second exit end are disposed on the same horizontal line, and the angle between the emitting direction of the first exit end and the emitting direction of the second exit end is 180 degrees.

19. The positioning device as claimed in claim 18, wherein:

the light source emitter emits the original emitted light, the first receiving end of the light source splitter receives the original emitted light, emits the first emitted light from the first exit end, and emits the second emitted light from the second exit end.

20. The positioning device as claimed in claim 19, wherein:

the first emitted light and the second emitted light are on the same horizontal line, and the angle between the first emitted light and the second emitted light is 180 degrees.

* * * * *